US010190702B2

(12) United States Patent
Fuller et al.

(10) Patent No.: US 10,190,702 B2
(45) Date of Patent: Jan. 29, 2019

(54) MEMS BASED SOLENOID VALVE

(71) Applicant: DunAn Microstaq, Inc., Austin, TX (US)

(72) Inventors: E. Nelson Fuller, Manchester, MI (US); Parthiban Arunasalam, Austin, TX (US); Joe A. Ojeda, Austin, TX (US); Chen Yang, Austin, TX (US)

(73) Assignee: DunAn Microstaq, Inc., Austin, TX (US)

( * ) Notice: Subject to any disclaimer, the term of this patent is extended or adjusted under 35 U.S.C. 154(b) by 21 days.

(21) Appl. No.: 15/451,615

(22) Filed: Mar. 7, 2017

(65) Prior Publication Data

US 2017/0268698 A1 Sep. 21, 2017

Related U.S. Application Data

(60) Provisional application No. 62/308,526, filed on Mar. 15, 2016.

(51) Int. Cl.
*F16K 99/00* (2006.01)
*F16K 31/02* (2006.01)
*F16K 31/08* (2006.01)

(52) U.S. Cl.
CPC ...... *F16K 99/0046* (2013.01); *F16K 99/0009* (2013.01); *F16K 31/02* (2013.01); *F16K 31/08* (2013.01); *F16K 31/082* (2013.01)

(58) Field of Classification Search
CPC .. F16K 99/0009; F16K 99/0046; F16K 31/02; F16K 31/082; F16K 31/08

(Continued)

(56) References Cited

U.S. PATENT DOCUMENTS 4,674,180 A * 6/1987 Zavracky ............. B81C 1/0015
216/17
5,374,792 A * 12/1994 Ghezzo .................. B29C 59/16
200/16 B (Continued)

OTHER PUBLICATIONS

Hiemstra, "The Design of Moving Magnet Actuators for Large-Range Flexure-Based Nanopositioning", Thesis for Degree of Master of Science in Engineering, 2014, pp. 1-317.

(Continued)

*Primary Examiner* — Matthew W Jellett
*Assistant Examiner* — Christopher Ballman
(74) *Attorney, Agent, or Firm* — MacMillan, Sobanski & Todd, LLC

(57) ABSTRACT

The electronically switchable MEMS valve includes a housing formed from soft magnetic material and defining a fluid flow path therethrough. A magnetic field generating member is mounted within the housing and connected to a source of electrical power. A MEMS valve portion is mounted within the magnetic field generating member, has a valve closing member movably mounted therein, and defines a portion of the fluid flow path therethrough. The valve closing element is movable between a closed position wherein the fluid flow path is blocked, and an open position wherein the fluid flow path is not blocked. When an electric current is removed from the magnetic field generating member, the valve closing element is configured to move to and remain in the one of the closed position and the open position to which the valve closing element is the closest when the electric current is removed.

3 Claims, 6 Drawing Sheets

(58) Field of Classification Search
USPC .......................................................... 251/65
See application file for complete search history.

(56) References Cited

U.S. PATENT DOCUMENTS

| | | | |
|---|---|---|---|
| 5,475,353 A | 12/1995 | Roshen et al. | |
| 5,536,988 A * | 7/1996 | Zhang | B81B 3/0021 |
| | | | 310/309 |
| 6,084,281 A * | 7/2000 | Fullin | H01H 50/005 |
| | | | 257/421 |
| 6,114,794 A * | 9/2000 | Dhuler | B81B 3/0024 |
| | | | 310/307 |
| 6,617,657 B1 * | 9/2003 | Yao | B81C 1/00484 |
| | | | 257/415 |
| 6,664,786 B2 * | 12/2003 | Kretschmann | G01R 33/028 |
| | | | 324/207.14 |
| 6,694,998 B1 * | 2/2004 | Hunnicutt | B60T 8/3695 |
| | | | 137/116.3 |
| 6,761,829 B2 * | 7/2004 | Harris | B81C 1/00484 |
| | | | 216/2 |
| 6,778,046 B2 * | 8/2004 | Stafford | B81B 7/0077 |
| | | | 200/181 |
| 6,791,233 B2 * | 9/2004 | Tomonari | F15C 5/00 |
| | | | 251/11 |
| 6,794,271 B2 * | 9/2004 | Harris | B81C 1/00357 |
| | | | 438/455 |
| 6,815,243 B2 * | 11/2004 | Lucak | B81C 1/00484 |
| | | | 438/52 |
| 6,988,706 B2 * | 1/2006 | Seeley | F15C 5/00 |
| | | | 251/129.06 |
| 7,106,493 B2 * | 9/2006 | Sanford | F15C 5/00 |
| | | | 359/298 |
| 7,183,622 B2 * | 2/2007 | Heck | B81C 1/0023 |
| | | | 257/528 |
| 7,280,016 B2 * | 10/2007 | Taya | B64C 21/02 |
| | | | 200/181 |
| 7,474,180 B2 * | 1/2009 | Bintoro | F15C 5/00 |
| | | | 200/181 |
| 7,803,281 B2 * | 9/2010 | Davies | B29C 65/02 |
| | | | 216/33 |
| 8,011,388 B2 * | 9/2011 | Fuller | F16K 99/0001 |
| | | | 137/625.65 |
| 8,113,482 B2 * | 2/2012 | Hunnicutt | F16K 99/0001 |
| | | | 137/625.25 |
| 8,810,341 B2 * | 8/2014 | Bachman | H01H 59/0009 |
| | | | 200/181 |
| 8,847,715 B2 * | 9/2014 | Wilson | H01H 51/2281 |
| | | | 335/205 |
| 9,287,062 B2 * | 3/2016 | Becker | H01P 1/15 |
| 9,523,358 B2 * | 12/2016 | Amirouche | A61M 5/14224 |
| 9,558,878 B1 * | 1/2017 | Abu-Qahouq | H01F 27/24 |
| 9,558,903 B2 * | 1/2017 | Becker | H01H 50/36 |
| 9,829,451 B2 * | 11/2017 | Gray | B01L 3/502738 |

OTHER PUBLICATIONS

Meneroud et al., "Bistable Micro Actuator for Energy Saving", Actuator, 2006, pp. 744-747.

Shinozawa, "A Proportional Microvalve Using a Bi-Stable Magnetic Actuator", IEEE, 1997, pp. 233-237.

* cited by examiner

MEMS BASED SOLENOID VALVE

CROSS-REFERENCE TO RELATED APPLICATIONS

This application claims the benefit of U.S. Provisional Application No. 62/308,526, filed Mar. 7, 2016, the disclosure of which is incorporated herein by reference.

BACKGROUND OF THE INVENTION

This invention relates in general to a MEMS valve for controlling the flow of fluid. In particular, this invention relates to an improved structure for an electronically switchable MEMS valve configured to control fluid flow in low pressure, high fluid flow applications.

MEMS (Micro Electro Mechanical Systems) are a class of systems that are physically small, having features with sizes in the micrometer range; i.e., about 10 µm or smaller. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today, there are many more micromachining techniques and materials available. The term "micromachined device" as used in this application means a device having some features with sizes of about 10 µm or smaller, and thus by definition is at least partially formed by micromachining. A micromachined device may also include both micromachined components and standard sized (larger) components.

Various MEMS devices have been proposed for controlling fluid flow within a fluid circuit. For example, U.S. Pat. No. 5,475,353, the disclosure of which is incorporated herein by reference, describes a micromachined electromagnetic switch that uses three magnets, including one permanent magnet and two soft magnets. The permanent magnet is mounted to a first conductive member, and the first conductive member is separated by an air gap from a second conductive member. A planar actuator coil is embedded in a dielectric, insulating layer and separated from the second conductive member by the insulating member. Application of a current in a first direction moves the permanent magnet toward a first one of the soft magnets and to an open position. When the current is removed from the coil, the permanent magnet remains attracted to the first soft magnet and in the open position. Application of a current in a second direction moves the permanent magnet toward a second one of the soft magnets and to a closed position. When the current is removed from the coil in this position, the permanent magnet remains attracted to the second soft magnet and in the closed position. The planar actuator coil however, does not have sufficient magnetic field strength to create the permanent magnet travel required for a high fluid flow valve.

Thus, it would be desirable to provide an improved structure for an electronically switchable MEMS valve that allows for fluid flow control in low pressure, high fluid flow applications.

SUMMARY OF THE INVENTION

This invention relates to an improved structure for an electronically switchable MEMS valve that allows for fluid flow control in low pressure, high fluid flow applications.

The electronically switchable MEMS valve includes a housing formed from soft magnetic material and defining a fluid flow path therethrough. A magnetic field generating member is mounted within the housing and connected to a source of electrical power. A MEMS valve portion is mounted within the magnetic field generating member, has a valve closing member movably mounted therein, and defines a portion of the fluid flow path therethrough. The valve closing element is movable between a closed position wherein the fluid flow path is blocked, and an open position wherein the fluid flow path is not blocked. When an electric current is removed from the magnetic field generating member, the valve closing element is configured to move to and remain in the one of the closed position and the open position to which the valve closing element is the closest when the electric current is removed.

In a second embodiment, the electronically switchable MEMS valve includes a housing formed from soft magnetic material and defining a fluid flow path therethrough. A magnetic field generating member is mounted within the housing and connected to a source of electrical power. A MEMS valve portion is mounted within the magnetic field generating member and includes a cover layer having an inlet port formed therethrough, a base layer having an outlet port formed therethrough, and an intermediate layer attached between the cover layer and the base layer. The inlet port and the outlet port define a fluid flow path therethrough, and a valve closing member is movably mounted to the intermediate layer and configured to be movable between a closed position wherein the outlet port of the base layer is blocked, and an open position wherein the outlet port of the base layer is not blocked. When an electric current is removed from the magnetic field generating member, the valve closing element is configured to move to and remain in the one of the closed position and the open position to which the valve closing element is the closest when the electric current is removed.

In a third embodiment, the electronically switchable MEMS valve includes a housing formed from soft magnetic material and defining a fluid flow path therethrough. The housing includes a peripheral wall, a first end wall attached to a first end thereof and having a fluid outlet opening formed therethrough, and a second end wall portion attached to a second end thereof, the second end wall portion extending between opposing corners of the peripheral wall and defining first and second fluid inlet openings. A wire-wound coil is mounted within the housing and is connected to a source of electrical power. A MEMS valve portion is mounted within the magnetic field generating member and includes a cover layer having an inlet port formed therethrough, a base layer having an outlet port formed therethrough, and an intermediate layer attached between the cover layer and the base layer. The inlet port and the outlet port define a fluid flow path therethrough, and a valve closing member is movably mounted to the intermediate layer and attached to walls thereof by a plurality of springs. The valve closing element is movable between a closed position wherein the outlet port of the base layer is blocked, and an open position wherein the outlet port of the base layer is not blocked. A permanent magnet defines an armature attached to the valve closing member. When an electric current is removed from the magnetic field generating member, the valve closing element is configured to move to and remain in the one of the closed position and the open position to which the valve closing element is the closest when the electric current is removed When in the open position the MEMS valve portion will remain in the open position against a pressure differential within the range of about 0.75 bar to about 2 bar.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
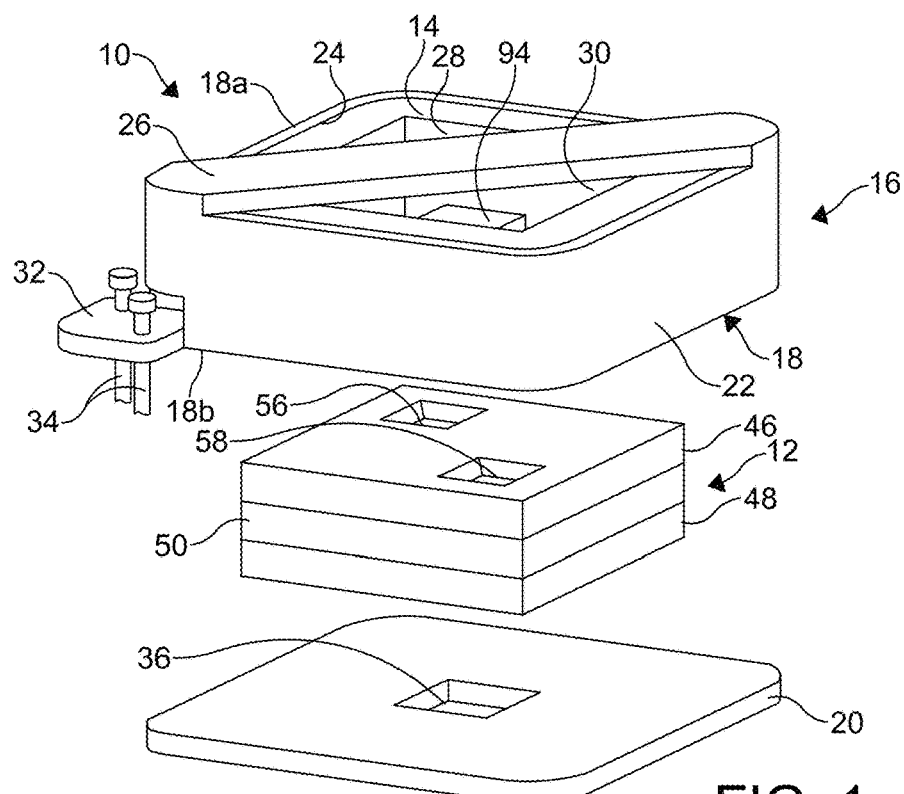
FIG. 1 is a partially exploded perspective view of an improved electronically switchable MEMS valve in accordance with this invention.

Referring now to the drawings, there is illustrated in FIG. 1 an improved electronically switchable MEMS valve 10. The electronically switchable MEMS valve 10 includes a MEMS valve portion 12 and a magnetic field generating member configured as a wire-wound coil 14 within a housing 16.

Figure 2:
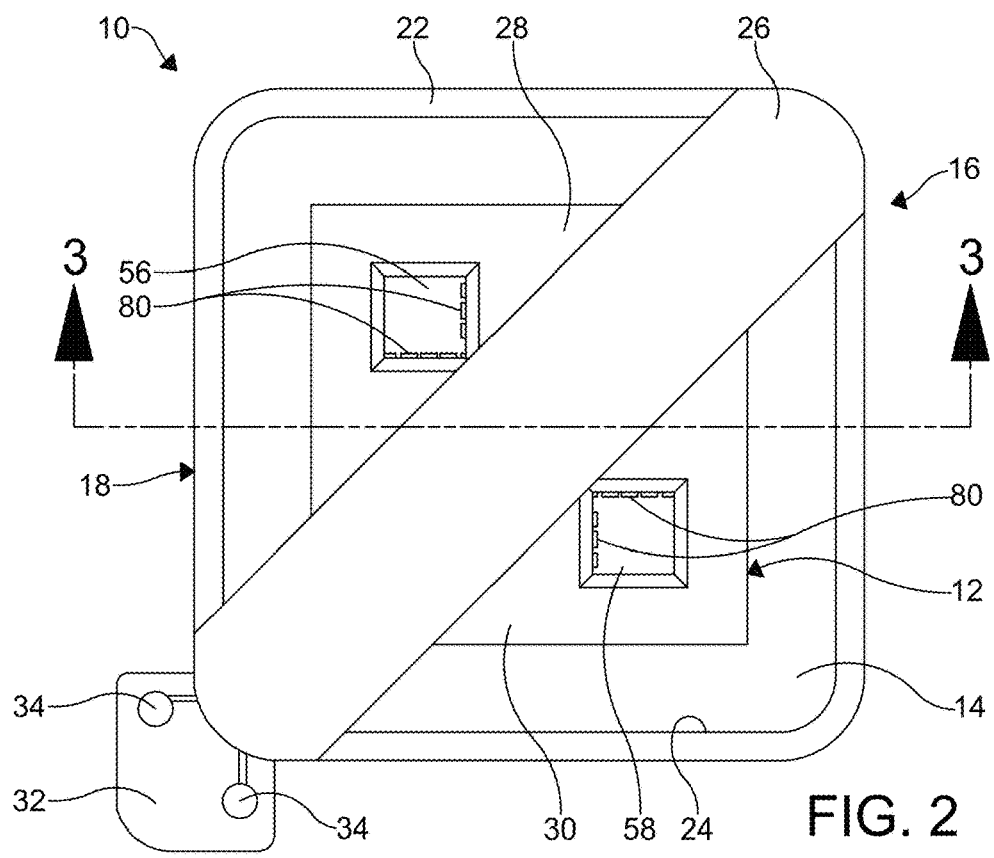
FIG. 2 is a plan view of the electronically switchable MEMS valve illustrated in FIG. 1.
Figure 3:
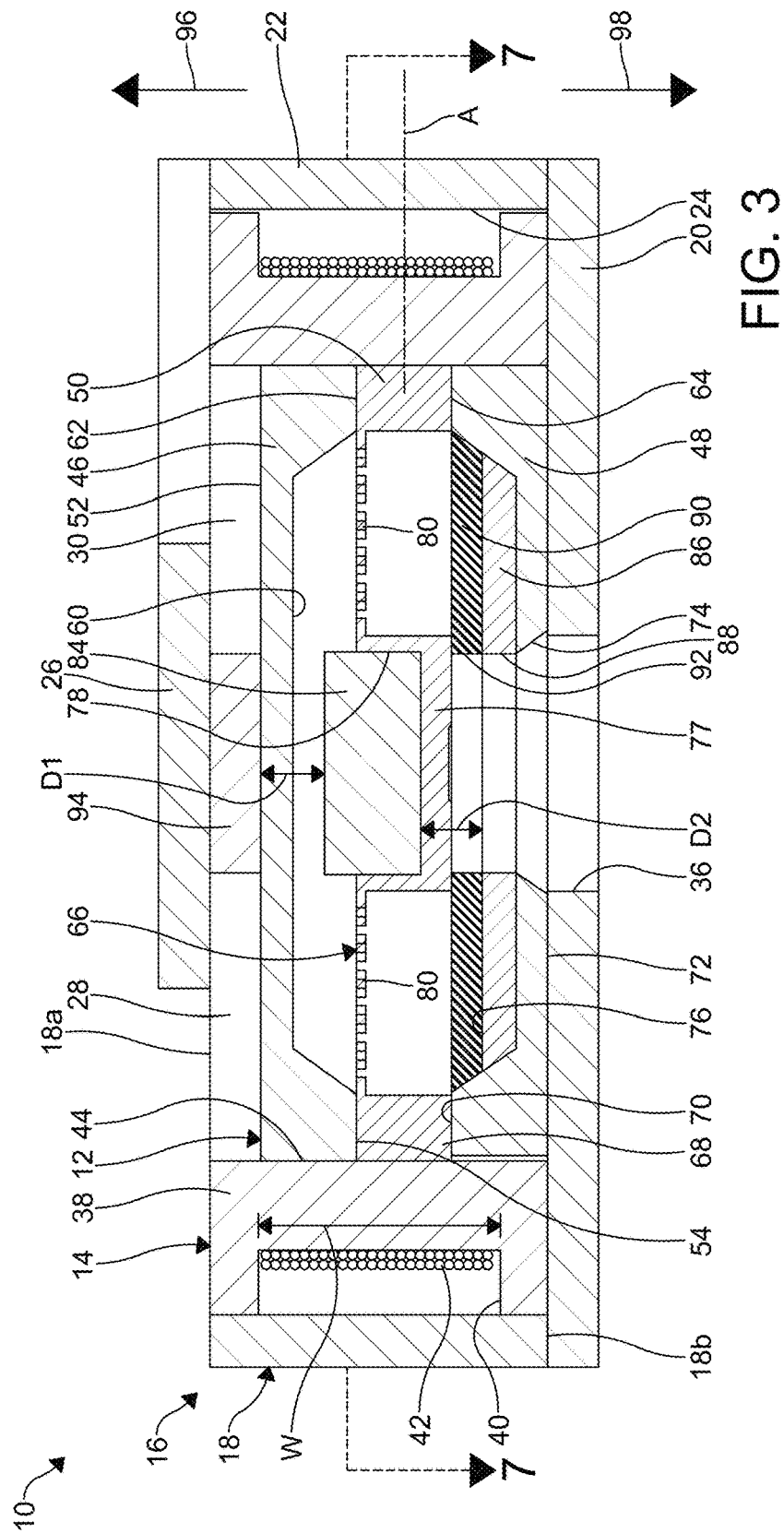
FIG. 3 is a cross-sectional view taken along the line 3-3 of FIG. 2 showing the improved electronically switchable MEMS valve in the closed position.

As shown in FIGS. 1 through 3, the housing 16 includes a peripheral wall portion 18 (the upper portion when viewing FIGS. 1 and 3) and an end wall 20 (the lower portion of the housing when viewing FIGS. 1 and 3). The peripheral wall portion 18 has a first end 18a and a second end 18b and includes a peripheral wall 22 having a substantially rectangular cross-sectional shape. Alternatively, the peripheral wall 22 may have any other desired cross-sectional shape, such as substantially cylindrical. The end wall 20 may be attached to the second end 18b of the peripheral wall portion 18 by any suitable means, such as welding, crimping, staking, and/or adhesive bonding.

The peripheral wall 22 defines a cavity 24 within which the wire-wound coil 14 and the MEMS valve portion 12 are mounted. The first end 18a of the peripheral wall portion 18 includes an end wall portion 26 that extends between opposing corners of the peripheral wall 22 and defines first and second fluid inlet openings 28 and 30, respectively. An electrical connector 32 may be attached to the peripheral wall 22. The electrical connector 32 may include wires 34 that electrically connect the wire-wound coil 14 to a source of electrical power (not shown).

The end wall 20 of the housing 16 is substantially planar and has a fluid outlet opening 36 formed therethrough. The first and second fluid inlet openings 28 and 30 and the fluid outlet opening 36 define a fluid flow path through the housing 16. Alternatively, the electronically switchable MEMS valve 10 may be configured such that the direction of fluid flow in the fluid flow path is reversed. In such a configuration, the opening 36 would function as a fluid inlet opening and the openings 28 and 30 would function as fluid outlet openings.

The peripheral wall portion 18, the end wall 20, and the end wall portion 26 of the housing 16 may be formed from soft magnetic material, such as annealed iron, mild steel, or silicon iron. As used herein, a soft magnetic material is defined as a material that only becomes magnetized in the presence of an external magnetic field, such as from a current carrying wire, and does not tend to remain magnetized when the external magnetic field is removed. As also used herein, a permanent magnet is defined as a magnet formed from hard magnetic material or ferromagnetic material that exhibits strong magnetization in the absence of an external magnetic field. Once magnetized, permanent magnets tend to stay magnetized.

The wire-wound coil 14 may be conventional in the art and includes a coil bobbin 38. The coil bobbin 38 may have any desired shape and is configured to fit within the cavity 24 of the peripheral wall portion 18. The coil bobbin 38 includes a circumferentially extending coil groove 40 within which a wire coil 42 is wound, and a centrally formed, and longitudinally extending, passageway 44. The illustrated coil groove 40, and the wire coil 42 wound therein, has a width W within the range of about 0.5 mm to about 1.0 mm. Alternatively, the coil groove 40 may have any desired width W, such as smaller than about 0.5 mm and larger than about 1.0 mm.

Figure 4:
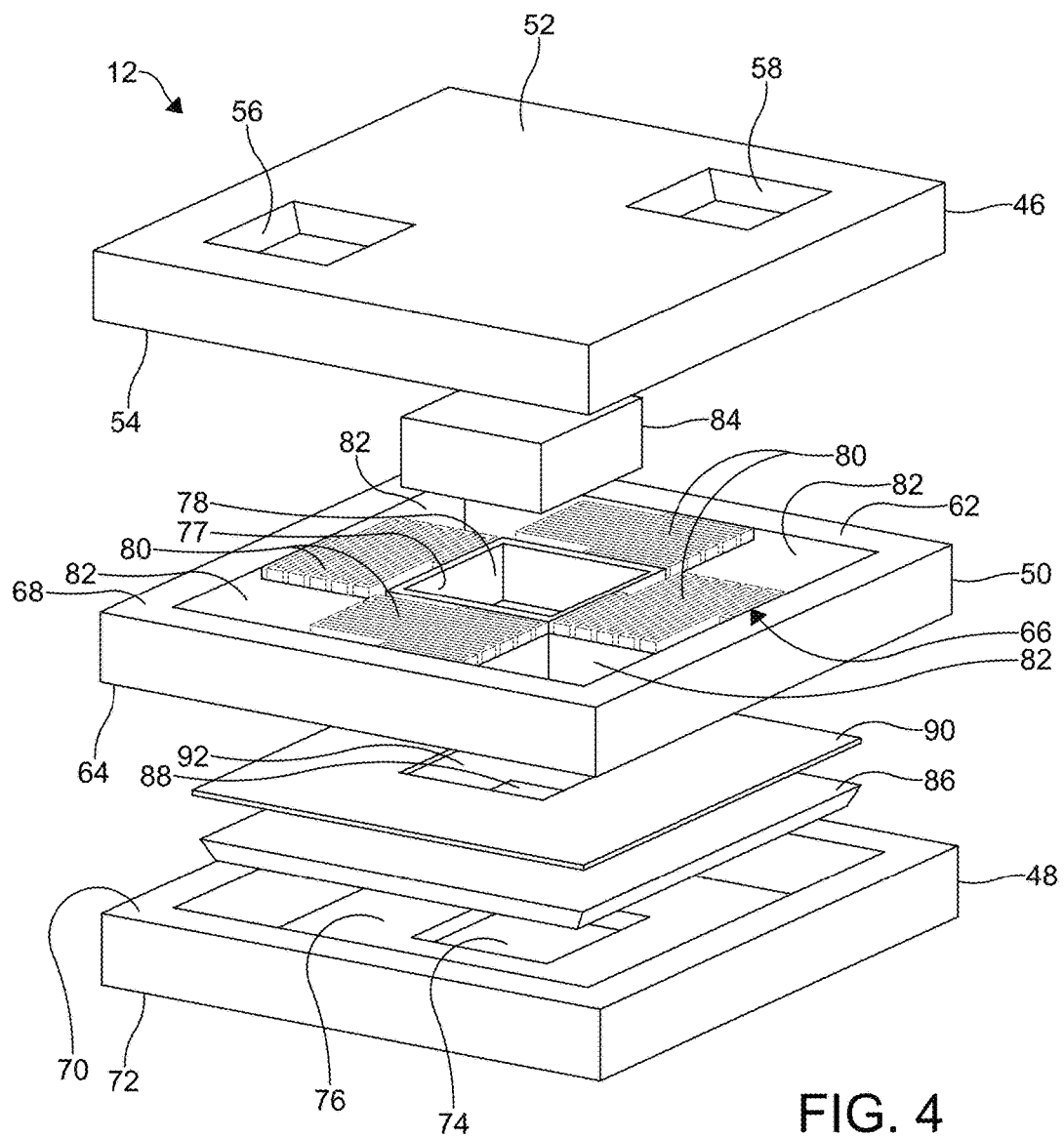
FIG. 4 is an exploded perspective view of the MEMS portion of the improved electronically switchable MEMS valve illustrated in FIGS. 1-3.
Figure 5:
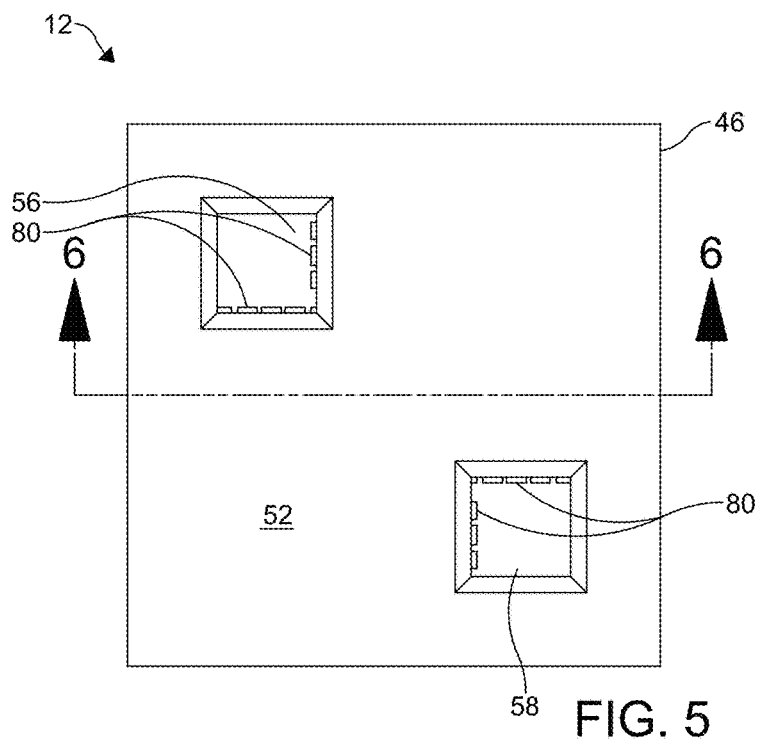
FIG. 5 is a plan view of the MEMS portion illustrated in FIGS. 1-4.

As best shown in FIGS. 3 and 4, the MEMS valve portion 12 includes a first or cover layer 46, a second or base layer 48, and a third or intermediate layer 50. The cover layer 46 has an outer surface 52, an inner surface 54 and first and second inlet ports 56 and 58 formed therethrough. A cavity 60 is formed in the inner surface 54. The intermediate layer 50 has a first surface 62 and a second surface 64 and defines a movable portion 66 and a non-movable portion 68. The base layer 48 has an inner surface 70, an outer surface 72, and an outlet port 74 formed therethrough. A cavity 76 is formed in the inner surface 70. In the illustrated embodiment, the outlet port 74 is substantially square and defines an opening of about 3 mm$^2$ Alternatively, the outlet port 74 may have any desired opening size, such as within the range of about 0.5 mm$^2$ to about 3.0 mm$^2$ Additionally, the outlet port 74 may have any other desired shape, such as rectangular or substantially circular. Similarly, the first and second inlet ports 56 and 58 are substantially square and have a combined opening size equal to or larger than the opening size of the outlet port 74; i.e., about 3 mm$^2$ or larger. Like the outlet port 74, the first and second inlet ports 56 and 58 may have other desired shapes, such as rectangular or substantially circular. The first and second inlet ports 56 and 58 and the outlet port 74 define a portion of the fluid flow path through the housing 16. As described above, the electronically switchable MEMS valve 10 may be configured such that the direction of fluid flow in the fluid flow path is reversed. In such a configuration, fluid flow through the MEMS valve portion 12 would also be reversed. In this configuration, the port 74 would function as a fluid inlet port, and the ports 56 and 58 would function as fluid outlet ports.

The cover layer 46, the base layer 48, and the intermediate layer 50 may be formed of any desired material or combination of materials, such as silicon, single crystal silicon, and/or similar material. Advantageously, the housing 16 may be formed with a relatively small footprint. For example, the illustrated housing 16 has a substantially square footprint with dimensions of about 10 mm×10 mm. Alternatively, the housing 16 may have any desired dimensions, such as within the range of about 8.0 mm to about 15.0 mm×about 8.0 mm to about 15.0 mm. Additionally, the housing 16 need not define a substantially square footprint, but may have other shapes, such as substantially rectangular, or substantially circular.

Similarly, the MEMS valve portion 12 may be formed with a small footprint. For example, the illustrated MEMS valve portion 12 has a substantially square footprint with dimensions of about 6 mm×6 mm. Alternatively, the MEMS valve portion 12 may have any desired dimensions, such as within the range of about 4.0 mm to about 8.0 mm×about 4.0 mm to about 8.0 mm. Additionally, the MEMS valve portion 12 need not define a substantially square footprint, but may have other desired shapes, such as rectangular or substantially circular.

The movable portion 66 of the intermediate layer 50 includes a valve closing member 77 having a substantially rectangular cross-sectional shape and further having a magnet cavity 78 formed therein. The movable portion 66 also includes a plurality of substantially planar convoluted springs 80 that connect the valve closing member 77 to the non-movable portion 68. Fluid flow openings 82 are defined between adjacent convoluted springs 80 and the non-movable portion 68 of the intermediate layer 50. In the illustrated embodiment, four convoluted springs 80 are shown, arranged such that one convoluted spring 80 extends between the non-movable portion 68 and each of four sides of the valve closing member 77. Alternatively, the valve closing member 77 may have other desired cross-sectional shapes, such as a substantially circular cross-sectional shape. Additionally, more or less than four convoluted springs 80 may be provided.

A permanent magnet defines an armature 84 and is mounted in the magnet cavity 78. The armature 84 has a rectangular cross-sectional shape corresponding to the shape of the magnet cavity 78. Alternatively, the armature 84 may have any shape corresponding to the shape of the magnet cavity 78.

A first soft magnetic member 86 defines a soft magnetic layer and includes an outlet port 88 formed therethrough and is mounted within the cavity 76 in the inner surface 70 of the base layer. A seal layer 90 includes an outlet port 92 formed therethrough and is also mounted within the cavity 76 in the inner surface 70 of the base layer such that the first soft magnetic member 86 is between the end wall 20 of the housing 16 and the seal layer 90. The seal layer may be formed from any suitable elastomeric material, such as EPDM rubber, natural rubber, and/or other desired elastomers.

Figure 6:
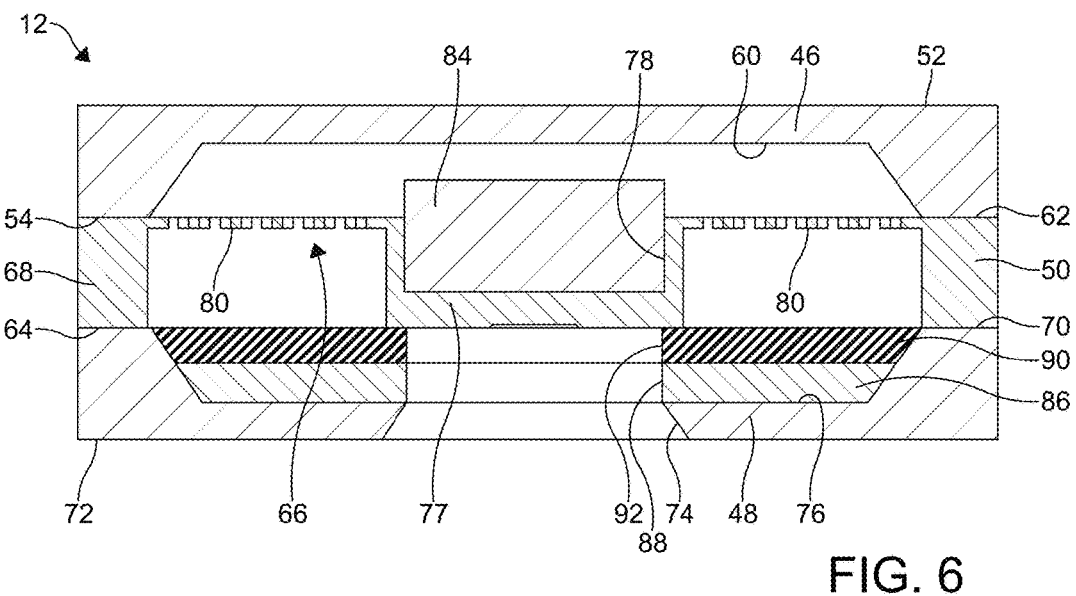
FIG. 6 is a cross-sectional view taken along the line 6-6 of FIG. 5.

When the MEMS valve portion 12 is assembled as shown in FIGS. 4 and 6, the armature 84 is mounted within the valve closing member 77 and the soft magnetic member 86 and the seal layer 90 are mounted within the cavity 76 in the inner surface 70 of the base layer. The inner surface 54 of the cover layer 46 engages the first surface 62 of the intermediate layer 50, and the inner surface 54 of the base layer 48 engages the second surface 64 of the intermediate layer 50. The cover layer 46, the intermediate layer 50, and the base layer 48 may be bonded together by any suitable method, such as silicon fusion bonding (SFB), eutectic bonding, adhesive bonding, and glass frit bonding. As shown in FIG. 3, the valve closing member 77 of the intermediate layer 50 is urged against the seal layer 90 about the outlet port 92, thus preventing the flow of fluid through the fluid outlet opening 36 and defining a closed position.

Figure 7:
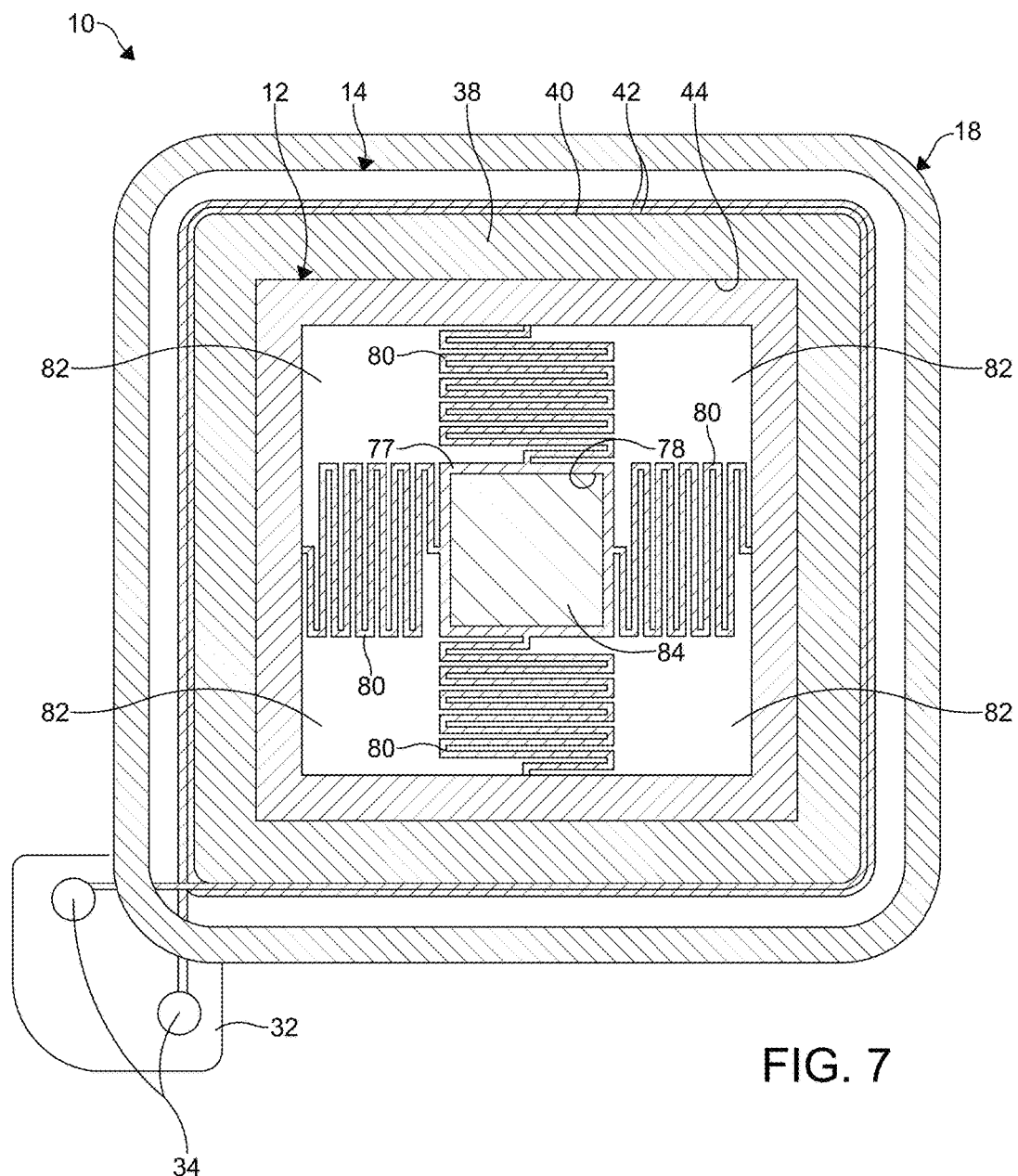
FIG. 7 is a cross-sectional view taken along the line 7-7 of FIG. 3.

When the electronically switchable MEMS valve 10 is assembled as shown in FIGS. 1, 3, and 7, the coil assembly is mounted within the cavity 24 of the peripheral wall portion 18 of the housing 16. The end wall 20 is attached to the second end 18b of the peripheral wall portion 18 of the housing 16 by any suitable method, such as welding, staking crimping, or adhesive bonding. The MEMS valve portion 12 is mounted within the passageway 44 of the coil bobbin 38 and thus within the wire coil 42. Significantly, the wire coil 42 extends substantially perpendicularly to a longitudinal axis A of the intermediate layer 50 of the MEMS valve portion 12. A second soft magnetic member 94 may be attached between the outer surface 52 of the cover layer 46 and the end wall portion 26. In the closed position, the armature 84 is spaced a distance D1 away from the second soft magnetic member 94 and a distance D2 from the first soft magnetic member 86. In the illustrated embodiment, the distance D1 is about 250 μm, and the distance D2 is about 250 μm. Alternatively, the distance D1 may be within the range of about 100 to about 300 μm, and the distance D2 may be within the range of about 100 to about 300 μm.

Because the wire coil 42 is external to the MEMS valve portion 12 oriented substantially perpendicularly to the longitudinal axis A of the intermediate layer 50 of the MEMS valve portion 12, the wire-wound coil 14 may be configured to generate a desired magnetic field, such as with about 100 to about 200 amp-turns.

In the absence of an electric current in the wire-wound coil 14, the armature 84 is attracted to the soft magnetic member; i.e., either the first soft magnetic member 86 or the second soft magnetic member 94, to which the armature 84 is closest. The magnetic attraction between the armature 84 and either the first soft magnetic member 86 or the second soft magnetic member 94 holds the armature 84 in a fixed position until an electric current is passed through the wire-wound coil 14, as described below.

Figure 8:
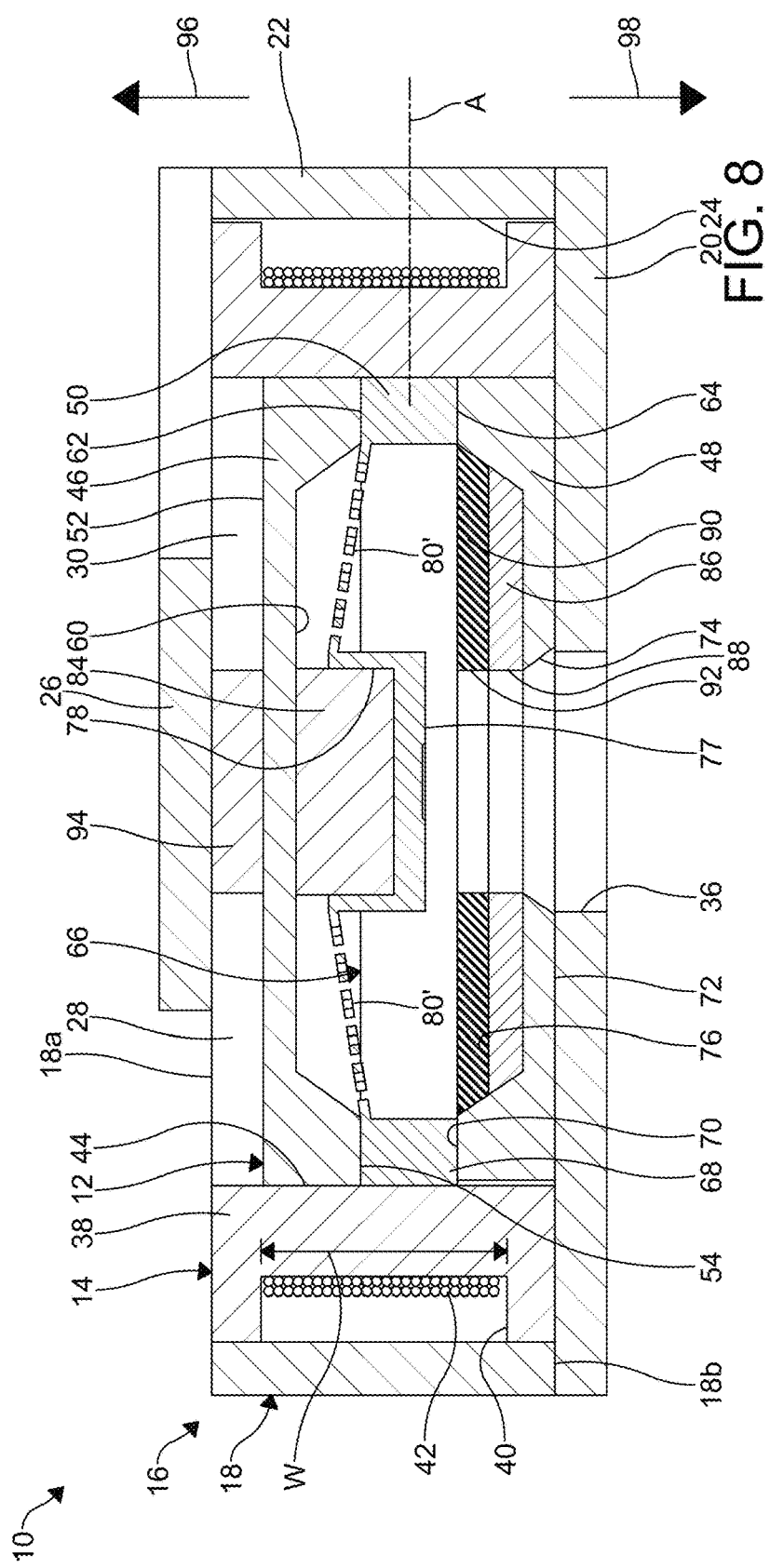
FIG. 8 is an alternate cross-sectional view of the improved electronically switchable MEMS valve illustrated in FIG. 3 showing the improved electronically switchable MEMS valve in the fully open position.

In operation, the electronically switchable MEMS valve 10 may be toggled or moved between the closed position as shown in FIG. 3 and an open position as shown in FIG. 8. In the closed position, the valve closing member 77 is urged into contact with the seal layer 90 about the outlet port 92, such that the flow of fluid through the outlet port 92, and thus through the fluid outlet opening 36, is prevented. In the open position, the armature 84 is urged against the inside surface of the cavity 60 of the cover layer 46, and the valve closing member 77 is moved away from the outlet port 92, thus allowing the flow of fluid through the outlet port 92 and through the fluid outlet opening 36.

When in the closed position, and when an electric current is passed through the wire-wound coil 14 in a first direction, the soft magnetic material of the second soft magnetic member 94 and the soft magnetic material of the end wall portion 26 of the housing 16 is magnetized, and the strength of the magnetic force between the armature 84 and the second soft magnetic member 94 and the end wall portion 26 is greater relative to the strength of the magnetic force between the armature 84 and the first soft magnetic member 86 and the end wall 20. The armature 84 then moves toward the second soft magnetic member 94; i.e., in the direction of the arrow 96, until the armature 84 engages an inside surface of the cavity 60, and the convoluted springs are in the position shown at 80' in FIG. 8. In the position shown in FIG. 8, the electronically switchable MEMS valve 10 is fully open, and fluid may flow between the first and second inlet ports 56 and 58 and the fluid outlet opening 36. The electric current may then be removed from the wire-wound coil 14 and the magnetic force between the armature 84 and the second soft magnetic member 94 and the end wall portion 26 causes the electronically switchable MEMS valve 10 to remain in the open position.

When in the open position, and when an electric current is passed through the wire-wound coil 14 in a second direction opposite the first direction, the soft magnetic material of the first soft magnetic member 86 and the soft magnetic material of the end wall 20 of the housing 16 are magnetized. The strength of the magnetic force between the armature 84 and the first soft magnetic member 86 and the end wall 20 is greater relative to the strength of the magnetic force between the armature 84 and the second soft magnetic member 94 and the end wall portion 26. The armature 84 thus moves toward the first soft magnetic member 86; i.e., in the direction of the arrow 98, until the armature 84 urges the valve closing member 77 of the intermediate layer 50 into the closed position wherein the valve closing member 77 is urged against the seal layer 90 about the outlet port 92, thus preventing the flow of fluid through the fluid outlet opening 36. In the position shown in FIG. 3, the electronically switchable MEMS valve 10 is in the closed position, and fluid flow between the first and second inlet ports 56 and 58 and the fluid outlet opening 36 is prevented. The electric current may then be removed from the wire-wound coil 14 and the magnetic force between the armature 84 and the first soft magnetic member 86 and the end wall 20 causes the electronically switchable MEMS valve 10 to remain in the closed position.

Advantageously, the electronically switchable MEMS valve 10 has been shown to allow adequate travel of the armature 84 from the closed position to the open position, and to allow a flow of air, or other desired gas or fluid, such as nitrogen, at a rate within the range of about 10 liters/minute to about 15 liters/minute. The electronically switchable MEMS valve 10 will then remain in the open position against a pressure differential within the range of about 0.75 bar to about 2 bar until the electric current is applied in the second direction to move the electronically switchable MEMS valve 10 to the closed position.

For example, when the electronically switchable MEMS valve 10 starts in the closed position with a pressure of about one bar applied to the inlet ports 56 and 58, the electronically switchable MEMS valve 10 may be switched to the open position with a momentary (for example within the range of about 100 ms to about 1 second) application of electric current to the wire-wound coil 14 in the first direction. This allows a flow of air through the electronically switchable MEMS valve 10 at a rate of about 15 liters/minute. The electronically switchable MEMS valve 10 will remain in the open position, after the electric current has been removed, until a momentary (for example within the range of about 100 ms to about 1 second) application of electric current is applied to the wire-wound coil 14 in the second direction to again move the electronically switchable MEMS valve 10 to the closed position. This cycle may then be repeated as often as necessary.

The principle and mode of operation of this invention have been explained and illustrated in its preferred embodiment. However, it must be understood that this invention may be practiced otherwise than as specifically explained and illustrated without departing from its spirit or scope.

What is claimed is:
1. An electronically switchable MEMS valve comprising:
a housing formed from soft magnetic material and defining a fluid flow path therethrough;

a magnetic field generating member configured as a wire-wound coil and mounted within the housing and connected to a source of electrical power; and a MEMS valve portion mounted within the magnetic field generating member, the MEMS valve portion including a cover layer having an inlet port formed therethrough, a base layer having an outlet port formed therethrough, an intermediate layer attached between the cover layer and the base layer, wherein the inlet port and the outlet port define a fluid flow path therethrough, a valve closing member movably mounted to the intermediate layer, the valve closing element movable between a closed position wherein the outlet port of the base layer is blocked, and an open position wherein the outlet port of the base layer is not blocked, a permanent magnet defining an armature attached to the valve closing member, a seal layer mounted within a cavity formed in an inner surface of the base layer, a first soft magnetic member mounted between the seal layer and the base layer, and a second soft magnetic member attached between an outer surface of the cover layer of the MEMS valve portion and the housing;

wherein when an electric current is removed from the magnetic field generating member, the valve closing element is configured to move to and remain in the one of the closed position and the open position to which the valve closing element is the closest when the electric current is removed;

wherein when in the closed position and when an electric current is passed through the wire-wound coil in a first direction, the soft magnetic material the second soft magnetic member and the soft magnetic material of the end wall portion is magnetized such that a strength of the magnetic force between the armature and the second soft magnetic member and the end wall portion is greater relative to a strength of the magnetic force between the armature and the first soft magnetic member and the end wall;

wherein the armature therefore moves toward the second soft magnetic member until the armature engages an inside surface of the cover layer and the MEMS valve portion is in the open position; and wherein when in the open position and when the electric current is removed from the wire-wound coil, the magnetic force between the armature and the second soft magnetic member and the end wall portion is sufficient to cause the MEMS valve portion to remain in the open position against a pressure differential within the range of about 0.75 bar to about 2 bar.

2. The electronically switchable MEMS valve according to claim 1, wherein when in the open position and when an electric current is passed through the wire-wound coil in a second direction opposite the first direction, the soft magnetic material of the first soft magnetic member and the soft magnetic material of the end wall of the housing is magnetized such that a strength of the magnetic force between the armature and the first soft magnetic member and the end wall is greater relative to a strength of the magnetic force between the armature and the second soft magnetic member and the end wall portion, wherein the armature therefore moves toward the first soft magnetic member until the armature urges the valve closing member of the intermediate layer into the closed position, and wherein when in the closed position and when the electric current is removed from the wire-wound coil, the magnetic force between the armature and the first soft magnetic member and the end wall is sufficient to cause the MEMS valve portion to remain in the closed position.

3. The electronically switchable MEMS valve according to claim 2, wherein the valve closing element is attached to walls of the intermediate layer by a plurality of springs.

* * * * *